United States Patent [19]

Ito et al.

[11] Patent Number: 4,773,012
[45] Date of Patent: Sep. 20, 1988

[54] SYSTEM FOR DETERMINING REFERENCE CORNERING BEHAVIOR OF WHEELED VEHICLE

[75] Inventors: Ken Ito; Naohiko Inoue, both of Yokohama, Japan

[73] Assignee: Nissan Motor Co., Ltd., Japan

[21] Appl. No.: 755,352

[22] Filed: Jul. 16, 1985

[30] Foreign Application Priority Data

Jul. 17, 1984 [JP] Japan .................. 59-147018

[51] Int. Cl.$^4$ .............................................. B62D 5/00
[52] U.S. Cl. ................................. 364/424.01; 180/142; 364/424.05
[58] Field of Search ................ 364/426, 424; 180/140, 180/141, 142, 197, 172, 179; 280/707, 90, 91; 318/580, 586

[56] References Cited

U.S. PATENT DOCUMENTS

| | | | |
|---|---|---|---|
| 3,866,706 | 2/1975 | Lincke et al. | 180/142 |
| 4,412,594 | 11/1983 | Furukawa et al. | 180/142 |
| 4,418,780 | 12/1983 | Ito et al. | 180/142 |
| 4,441,572 | 4/1984 | Ito et al. | 180/140 |
| 4,527,654 | 7/1985 | Shibahata et al. | 180/140 |
| 4,597,462 | 7/1986 | Sano et al. | 180/140 |
| 4,706,771 | 1/1986 | Kawabe et al. | 180/142 |
| 4,706,979 | 7/1986 | Kawabe et al. | 280/91 |

*Primary Examiner*—Parshotam S. Lall
*Assistant Examiner*—Thomas G. Black
*Attorney, Agent, or Firm*—Leydig, Voit & Mayer

[57] ABSTRACT

A reference setting system for determining a target vehicle cornering behavior which can be used as a standard for determining a deviation of an actual cornering behavior such yaw rate and lateral acceleration of the vehicle, is arranged to have a steering angle sensor, a vehicle speed sensor and an operational unit which determines the target behavior from sensed steering angle and vehicle speed in accordance with predetermined equations of motion of a wheeled vehicle. The system may further has a differentiator for determining a steering speed from the steering angle, and a device for adjusting the target behavior in accordance with the steering speed.

15 Claims, 5 Drawing Sheets

SYSTEM FOR DETERMINING REFERENCE CORNERING BEHAVIOR OF WHEELED VEHICLE

BACKGROUND OF THE INVENTION

1. Field of the Invention

The present invention relates to a reference setting system for determining a desired reference or target cornering behavior, such as a desired yaw rate or lateral acceleration, of a motor vehicle or the like.

Determination of such a reference cornering behavior is espectially important in a steering control system for steering either or both of front and rear wheels in combination with a conventional mechanical steering linkage.

2. Description of the Related Art

To facilitate understanding the present invention, a brief reference is made to an example of a steering control system disclosed in Japanese Patent Application No. 58-201287, filed by the assignee of the present application. (The applicant(s) of the present application believes that this is not a part of the prior art.) This steering control system is arranged to steer a vehicle through front or rear wheels in cooperation with a steering system including a steering gear so as to reduce a deviation of an actual stability factor determined by input steering amount, vehicle speed, and vehicle cornering behavior such as yaw rate or lateral acceleration, from a predetermined target staility factor. This system is efficacious when a vehicle is in a steady state circular motion or when a steering speed is low. However, this system is unsatisfactory when the vehicle is in a transient motion, because this system employs the target stability factor (which is constant) as a desired reference value of the vehicle behavior, and does not take the dynamics of the vehicle into account.

For example, when the steering wheel is turned rapidly, there arises a time lag of a considerable amount between an input change of an actual steered angle of the steerable road wheels caused by the angular displacement of the steering wheel, and an output change of the actual vehicle behavior such as yaw rate or lateral acceleration. Therefore, during an initial time interval after initiation of the input change, the yaw rate and lateral acceleration of the vehicle remain almost zero, and the actual stability factor which is determined by using the yaw rate or lateral acceleration as a denominator of a fraction increases to an extremely large value. As a result, the deviation of the actual stability factor from the target stability factor is increased to a corresponding extreme value, and causes undesirable hunting in the control system. This control system tends to make the vehicle behavior oscillatory and unstable, and cannot provide an accurate control especially when the steering wheel is turned rapidly.

It is possible to solve this problem by reducing the gain of the control system. In this case, however, reduction of the control gain deteriorates the response of the control system seriously.

SUMMARY OF THE INVENTION

It is an object of the present invention to provide a reference setting system for determining a target value of a vehicle cornering behavior, so arranged that the dynamics of a vehicle is taken into account so as to always provide an adequate control especially when the system is used in a steering control system.

It is another object of the present invention to provide such a reference setting system capable of adjusting the target value of the vehicle behavior properly in accordance with steering speed.

According to the present invention, a reference setting system for determining a target value of a cornering behavior of a wheeled vehicle comprises means for sensing a steering amount (a steering angle of a steering wheel), means for sensing a vehicle speed, and operational means (which may be a digital computer or an analog computer). The operational means is connected with the steering amount sensing means and the vehicle speed sensing means for determining the target value expressed by predetermined equations of motion of a wheeled vehicle from the steering amount sensed by the steering amount sensing means and the vehicle speed sensed by the vehicle speed sensing means.

The operational means may comprises adjusting means for determining a steering speed which is the time rate of change of the sensed steering amount, and adjusting a predetermined parameter used in the equations of motion in accordance with the steering speed.

DETAILED DESCRIPTION OF THE INVENTION

Figure 1:
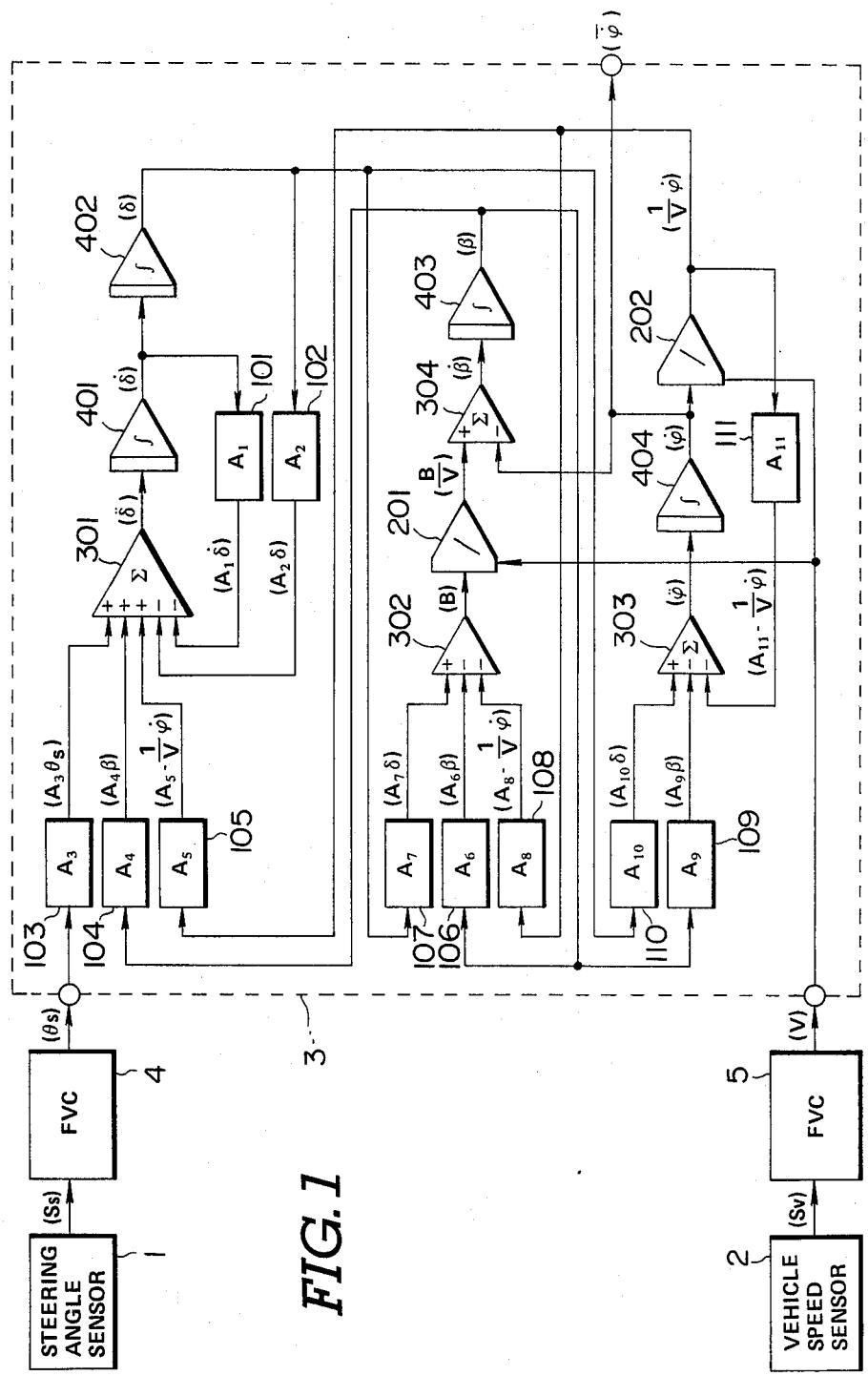
FIG. 1 is a block diagram showing a reference setting system of a first embodiment of the present invention.

One embodiment of the present invention is shown in FIGS. 1-5. The system of this embodiment has a steering angle sensor (steering amount sensor) 1, a vehicle speed sensor, and a main operational unit 3. The steering angle sensor 1 is of a.type known per se, and produces a pulse signal $S_s$ having a frequency proportional to a steering angle. The vehicle speed sensor 2 is also of a known type, and produces a pulse signal $S_v$ having a frequency proportional to a vehicle speed. The signal $S_s$ is inputted to a frequency-to-voltage converter 4, which supplies the operational unit 3 with a voltage steering angle signal $\theta_s$ which is proportional to the steering angle and whose polarity is determined by a steering direction. The signal $S_v$ is inputted to a frequency-to-voltage converter 5, which supplies the operational unit 3 with a voltage vehicle speed signal V which is proportional to the vehicle speed.

The operational unit 3 determines a target value $\dot{\phi}$ of a cornering behavior of the vehicle on the basis of equations of motion mentioned later. In this embodiment, the cornering behavior is a yaw rate of the vehicle. However, it is optional to employ a lateral acceleration of the vehicle instead of the yaw rate. The operational unit 3 comprises eleven noninverting amplifiers 101-111, two dividers 201 and 202, four adder-subtracters 301-304, and four integrators 401-404, which are interrelated with one another as shown in FIG. 1.

Figure 2A:
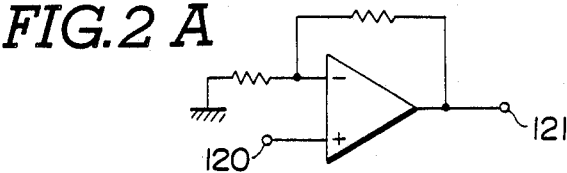
FIG. 2A is a circuit diagram of a noninverting amplifier usable in the system of FIG. 1.
Figure 2B:
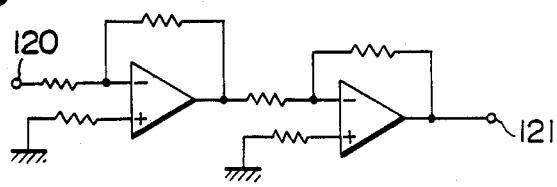
FIG. 2B is a circuit diagram of a noninverting amplifier of another type, usable in place of the amplifier of FIG. 2A.
Figure 3:
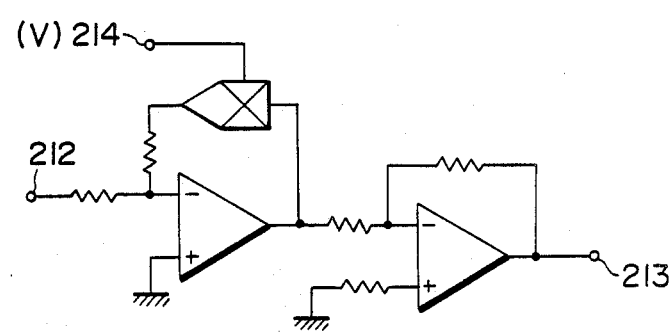
FIG. 3 is a circuit diagram of a divider usable in the system of FIG. 1.
Figure 4:
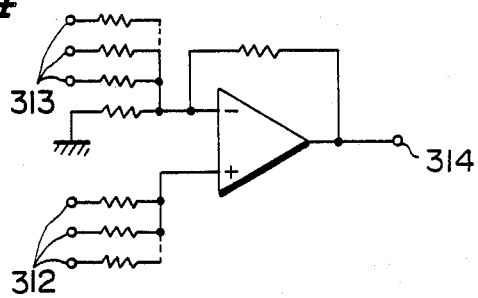
FIG. 4 is a circuit diagram of an adder-subtracter usable in the system of FIG. 1.
Figure 5:
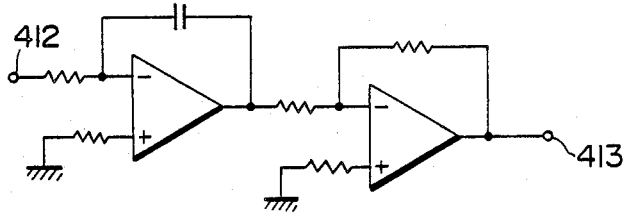
FIG. 5 is a circuit diagram of an integrator usable in the system of FIG. 1.

Each of the noninverting amplifiers 101-111 is of a type shown in FIG. 2A or a type shown in FIG. 2B, which are both known per se. In either case, each amplifier has an input terminal 120 and an output terminal 121. Each of the dividers 201 and 202 is of a known type shown in FIG. 3, and has a numerator input terminal 212, an output terminal 213, and a denominator (vehicle speed V) input terminal 214. Each of the adder-subtractors 301-304 is of a known type shown in FIG. 4, and has one or more addition input terminals 313, one or more subtraction input terminals 313 and an output terminal 314. Each of the integrators 401-404 is of a known type shown in FIG. 5, and has an input terminal 412 and an output terminal 413.

It is known that movement of a vehicle is approximately expressed by the following equations of motion. Equation of motion relating to steering system;

$$I_k \ddot{\delta} + D_k \dot{\delta} + K_s \left( \delta - \frac{\theta_s}{N} \right) = 2\xi K_f \left( \beta + \frac{l_f}{V} \dot{\phi} - \delta \right) \quad (1)$$

Equations of motion of the center of gravity of a vehicle;

$$mV(\dot{\beta} + \dot{\phi}) = -2K_f \left( \beta + \frac{l_f}{V} \dot{\phi} - \delta \right) - 2K_r \left( \beta - \frac{l_r}{V} \dot{\phi} \right) \quad (2)$$

$$I_z \ddot{\phi} = -2K_f \left( \beta + \frac{l_f}{V} \dot{\phi} - \delta \right) l_f + 2K_r \left( \beta - \frac{l_r}{V} \dot{\phi} \right) l_r \quad (3)$$

In the equations;
$I_k$ = moment of inertia about a kingpin
$D_k$ = viscosity coefficient about the kingpin
$K_s$ = steering stiffness
$\theta_s$ = steering angle of the steering wheel
$\delta$ = actual steered angle of steerable road wheels
$N$ = overall steering gear ratio
$\xi$ = trail (= pneumatic trail + caster trail)
$\dot{\phi}$ = yaw rate
$\beta$ = slip angle of the center of gravity of the vehicle
$K_f$ = front cornering power
$K_r$ = rear cornering power
$l_f$ = distance between the front axle and the center of gravity
$l_r$ = distance between the rear axle and the center of gravity
$m$ = mass of the vehicle
$I_z$ = moment of inertia about the yaw axis of the vehicle
$V$ = vehicle speed The equations (1), (2) and (3) can be rearranged as follows;

$$\ddot{\delta} = -\frac{D_k}{I_k} \dot{\delta} - \frac{K_s + 2\xi K_f}{I_k} \delta + \frac{K_s}{I_k N} \theta_s + \frac{2\xi K_f}{I_k} \beta + \frac{2\xi K_f l_f}{I_k} \cdot \frac{1}{V} \dot{\phi} \quad (1')$$

$$\dot{\beta} = \frac{1}{V} \left( -\frac{2(K_f + K_r)}{m} \beta + \frac{2K_f}{m} \delta - \frac{2(K_f l_f - K_r l_r)}{m} \frac{1}{V} \dot{\phi} \right) - \dot{\phi} \quad (2')$$

$$\ddot{\phi} = -\frac{2(K_f l_f - K_r l_r)}{I_z} \beta + \frac{2K_f l_f}{I_z} \delta - \frac{2(K_f l_f^2 - K_r l_r^2)}{I_z} \frac{1}{V} \dot{\phi} \quad (3')$$

In the equation (1'), it is convenient to use the following expressions;

$$\frac{D_k}{I_k} = A_1, \frac{K_s + 2\xi K_f}{I_k} = A_2, \frac{K_s}{I_k N} = A_3, \frac{2\xi K_f}{I_k} = A_4, \frac{2\xi K_f l_f}{I_k} = A_5,$$

(Each of $A_1$-$A_5$ is contant.). The gains of the noninverting amplifies 101-105 are set equal to $A_1$-$A_5$, respectively. For the equation (2'), the gains of the noninverting amplifieres 106-108 are respectively, set equal to $A_6$, $A_7$ and $A_8$ which are expressed as follows;

$$\frac{2(K_f + K_r)}{m} = A_6, \frac{2K_f}{m} = A_7, \frac{2(K_f l_f - K_r l_r)}{m} = A_8,$$

(Each of $A_6$-$A_8$ is constant.). For the equation (3'), the gains of the noninverting amplifiers 109-111 are, respectively, set equal to $A_9$, $A_{10}$ and $A_{11}$ which are rexpressed as follows;

$$\frac{2(K_f l_f - K_r l_r)}{I_z} = A_9, \frac{2K_f l_f}{I_z} = A_{10}, \frac{2(K_f l_f^2 - K_r l_r^2)}{I_z} = A_{11}$$

(Each of $A_9$-$A_{11}$ is constant.).

The system of FIG. 1 works as follows: The amplifier 101 supplies the adder-subtracter 301 with a signal representing the product $A_1 \dot{\delta}$ of the constant $A_1$ and an angular velocity $\dot{\delta}$ of the actual steered angle (the time rate of change of the actual angle) determined by the integrator 401 as mentioned later. The amplifier 102 supplies the adder-subtracter 301 with a signal representing the product $A_2 \delta$ of the constant $A_2$ and the actual angle $\delta$ determined by the integrator 402 as mentioned later. The amplifier 103 supplies the adder-subtracter 301 with a signal representing the product $A_3 \theta_s$ of the constant $A_3$ and the steering angle $\theta_s$. The amplifier 104 supplies the adder-subtracter 301 with a signal representing the product $A_4 \beta$ of the constant $A_4$ and a slip angle $\beta$ of the center of gravity determined by the integrator 403. The amplifier 105 supplies the adder-subtracer 301 with a signal representing the product $A_5 \cdot 1/V \dot{\phi}$ of the constant $A_5$ and the ratio of the yaw rate $\dot{\phi}$ to the vehicle speed V, determined by the divider 202. From these five input signals, the adder-subtracter 301 determines the angular acceleration $\ddot{\delta}$ of the actual angle. From the angular acceleration, the integrator 401 determines the angular velocity $\dot{\delta}$ of the actual angle. From the angular velocity, the integrator 402 determines the actual angle $\delta$.

The amplifier 106 produces a signal representing the product $A_6\beta$ of the constant $A_6$ and the slip angle $\beta$ of the center of gravity, determined by the integrator 403. The amplifier 107 produces a signal representing the product $A_7\delta$ of the constant $A_7$ and the actual angle $\delta$ determined by the integrator 402. The amplifier 108 produces a signal representing the roduct $A_8 \cdot 1/V \dot{\phi}$ of the constant $A_8$ and the quotient $1/V \dot{\phi}$ determined by the divider 202. The three signals produced by the amplifiers 106–108 are inputted to the adder-subtracter 302, which determines the algebraic sum (which is interposed between parentheses in the equation (2'), and expressed as B in FIG. 1) of the three products represented by the three input signals. The divider 201 divides the sum B by the vehicle speed V, and inputs a signal representing the quotient B/V to the subtracter 304. The subtracter 304 further receives a signal representing the yaw rate $\dot{\phi}$ from the integrator 404, and determines the difference $B/V - \dot{\phi}$. Thus, the subtracter 304 outputs a signal representing the angular velocity $\dot{\beta}$ of the slip angle of the center of gravity, expressed by the equation (2'). From the output signal of the subtracter 304, the integrator 403 determines the slip angle $\beta$ of the center of gravity.

The amplifier 109 produces a signal representing the product $A_9\beta$ of the constant $A_9$ and the slip angle $\beta$ of the center of gravity. The amplifier 110 produces a signal representing the product $A_{10}\delta$ of the constant $A_{10}$ and the actual steered angle $\delta$. The amplifier 111 produces a signal representing the product $A_{11}1/V \dot{\phi}$ of the constant $A_{11}$ and the quotient $1/V \dot{\phi}$. The signals produced by the amplifiers 109–111 are inputted to the adder-subtracter 303, which determines the yaw acceleration $\ddot{\phi}$ by calculating the equation (3'). From the yaw acceleration $\ddot{\phi}$, the integrator 404 determines the yaw rate $\dot{\phi}$. The thus determined yaw rate $\dot{\phi}$ is supplied to the subtracter 304 on one hand. On the other hand, the yaw rate $\dot{\phi}$ determined by the integrator 404 is outputted from the operational unit 3 as a target value of the vehicle cornering behavior (a target value $\dot{\phi}$ of the yaw rate). The divider 202 divides the yaw rate $\dot{\phi}$ by the vehicle speed V, and sends a signal representing the result of the division to the amplifiers 105, 108 and 111.

Figure 6:
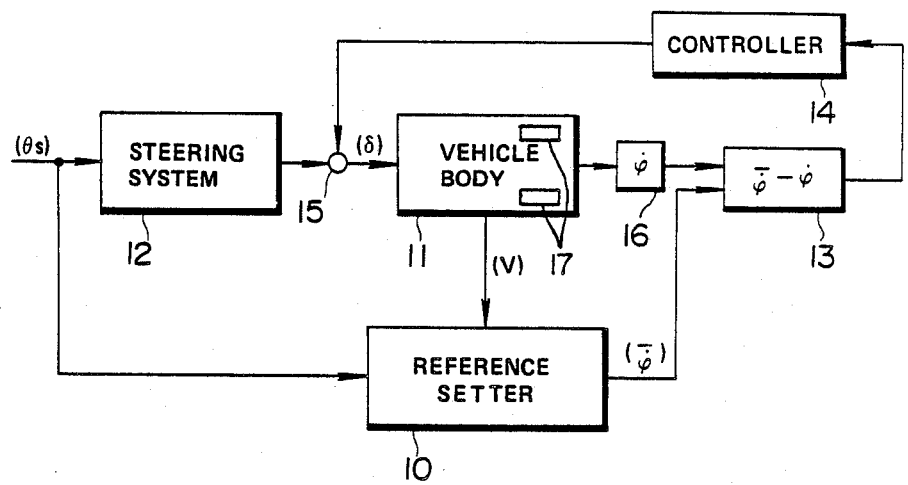
FIG. 6 is a block diagram of a vehicle steering control system to which the present invention is applied.

FIG. 6 shows a vehicle steering control system which uses the system of FIG. 1 as a reference setter 10. The system of FIG. 6 is arranged to steer the front wheels 17 of the vehicle secondarily in addition to the steering action of the steering linkage. The system of FIG. 6 includes a vehicle body 11 including steering wheels 17, a steering system 12, a vehicle behavior sensor 16 such as a yaw rate sensor, the above-mentioned reference setter 10 for determining a target value, a comparator 13 for determining a yaw rate deviation, a controller 14, and an actuator 15 serving as a summing point. From the steering angle $\theta_s$ inputted through the steering wheel by the driver, the steering system 12 determines the actual steered angle $\delta$ according to its gear ratio, and steers the front steerable road wheels 17 of the vehicle. The reference setter 10 determines the target value $\dot{\phi}$ of the yaw rate from the vehicle speed V and the steering angle $\theta_s$ by solving the equations of motion as mentioned with reference to FIG. 1.

On the other hand, the vehicle behavior sensor 16 senses an actual yaw rate $\dot{\phi}$ of the vehicle. The comparator 13 determines a deviation of the sensed actual yaw rate from the target value determined by the reference setter 10. The controller 14 of this example produces a control signal representing a product of the deviation determined by the comparator 13 and a predetermined constant gain C. In accordance with the product of the deviation and the constant C, the actuator 15 corrects the actual steered angle determined by the steering system 12 so as to reduce the deviation to zero. Therefore, the actuator 15 steers the vehicle through the front wheels 17, for example, in cooperation with the steering system so that the actual yaw rate approaches the target value, and thereby improves the stability of the vehicle on turns.

This steering control system takes the dynamics of a vehicle into account by using, as the target value, a vehicle behavior predicted from the equations of motion of a vehicle. Therefore, this system can provide optimum steering characteristics not only when the vehicle is in a steady state circular motion and when the steering speed is low, but also when the vehicle is in a transient motion such as when the steering speed is high.

Needless to say, it is possible to arrange the system of FIG. 1 to provide a target value of the lateral acceleration of the vehicle or other parameters, instead of the target value of the yaw rate. The present invention is not limited to a steering control system such as the system of FIG. 6, but applicable to other vehicle control systems, such as, a system for controlling a braking force distribution between front and rear wheels, and a system for controlling driving force distribution between front and rear wheels in a four-wheel-drive vehicle. In these latter cases, the present invention can stabilize the steering characteristics which tend to be affected by decrease of the cornering force due to weight transfer or slip during acceleration and deceleration of the vehicle. The system of FIG. 1 is constituted by the analog devices. However, it is a matter of course that the present invention can be embodied by using a digital circuitry such as a microcomputer.

Figure 7:
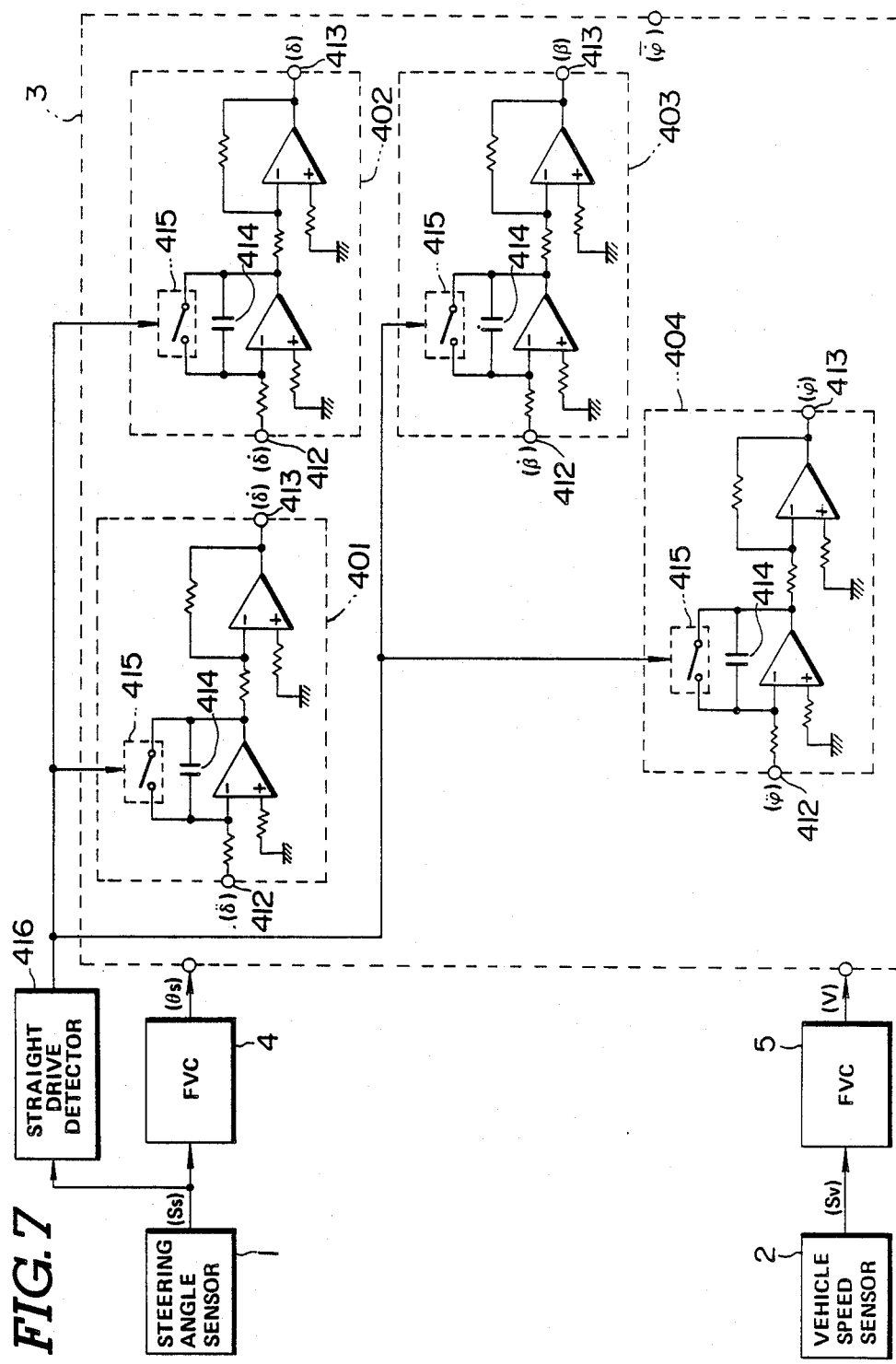
FIG. 7 is a block diagram similar to FIG. 1, but showing a modification of the system of FIG. 1.

FIG. 7 shows a modification of the system of FIG. 1. During operation, each of the integrators 401–404, shown in FIGS. 1 and 5, produces and accumulates a drift (error). Therefore, there is a fear that an error of the target value $\dot{\phi}$ of the vehicle behavior will be increased to a considerable amount by the drifts of the integrators. The system of FIG. 7 is arranged to avoid such a possibility. In the system of FIG. 7, an electronic switch 415 is connected in parallel to a feedback capacitor 414 of each of the integrators 401–404. There is further provided a straight drive detector 416 for turning on the switches 415.

The straight drive detector 416 is constituted by a microcomputer having a timer therein, for example. The detector 416 monitors the pulse signal $S_s$ having the frequency proportional to the steering angle of the steering wheel, and determines whether the vehicle is moving straight ahead or not by determining whether the steering angle $\theta_s$ continues within a predetermined range between limits ($\pm 10°$, for example) during a predetermined time interval (2 seconds, for example). If the straight drive detector 416 determines that the movement of the vehicle is not straight, the detector 416 holds the electronic switches 415 in an off states, and by so doing, allows the integrators 401–404 to operate to determine the target vehicle behavior together with the other elements of the operational unit 3 in the same manner as in FIG. 1. In the case that the vehicle is moving straight ahead and there is no need of determining the target vehicle behavior, the straight drive detector 416 resets the integrators 401–404 to cancel their drifts by switching on the electronic switches 415. Therefore, the system of FIG. 7 can prevent the error in calculation of the target behavior from increasing beyond a negligible range.

Figure 8:
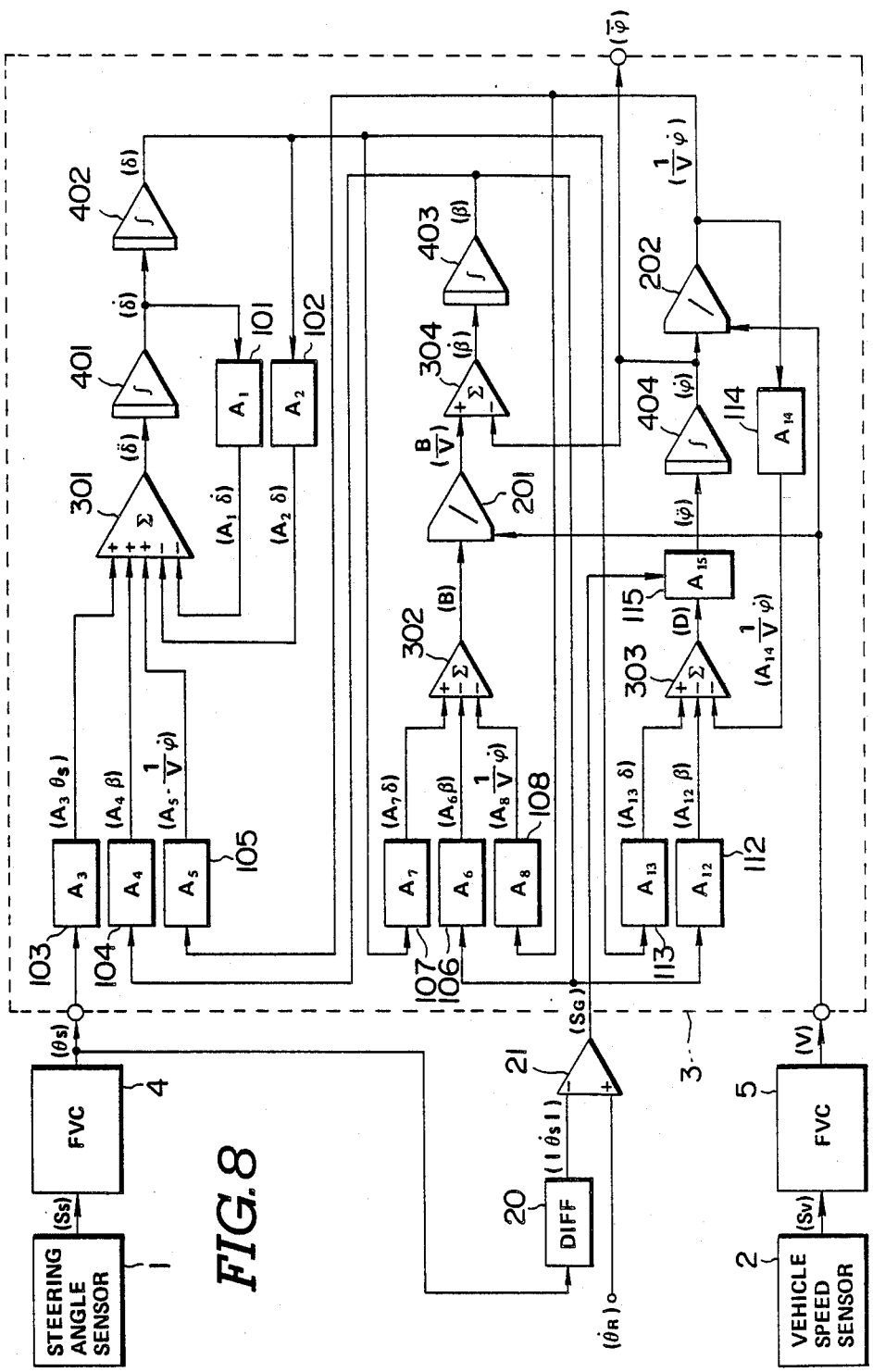
FIG. 8 is a block diagram of a reference setting system of a second embodiment of the present invention.

A second embodiment of the present invention is shown in FIG. 8. The system of this embodiment is arranged to adjust the characteristic of the operational unit 3 in accordance with a steering speed so as to improve the directional stability of the vehicle when the vehicle is moving straight ahead and when the steering speed is low, and to improve the response of the vehicle when the steering speed is high.

In general, the response of a vehicle tends to become worse when the moment of inertia $I_z$ about the yaw axis in the equation (3) is increased, and tends to become better when the moment of inertia $I_z$ is decreased. The actual moment of inertia $I_z$ is a quantity having a constant value which is different from vehicle to vehicle. The system of this embodiment is arranged to change the characteristic of the operational unit 3 by altering the value of the moment of inertia $I_z$ used in the calculation.

The above-mentioned equation (3′) can be rewritten as follows:

$$\ddot{\phi} = \frac{1}{I_z}\left(-2(K_f l_f - K_r l_r)\beta + 2K_f l_f \delta - 2(K_f l_f^2 - K_r l_r^2)\frac{1}{V}\dot{\phi}\right) \quad (3'')$$

It is convenient to use the following expressions;

$$\frac{1}{I_z} = A_{15},\ 2(K_f l_f - K_r l_r) = A_{12},$$

$$2K_f l_f = A_{13},\ 2(k_f l_f^2 - K_r l_r^2) = A_{14},$$

(Each of A12–A14 is constant.) In this embodiment, the noninverting amplifiers 109–111 shown in FIG. 1 are replaced, respectively, by noninverting amplifiers 112–114 whose gains are set equal to A12–A14, respectively. Furthermore, a variable gain noninverting amplifier 115 having a gain corresponding to A15 is connected between the adder-subtracter 303 and the integrator 404.

The system of FIG. 8 further has a differentiator 20 and a comparator 21. The differentiator 20 differentiates the steering angle $\theta_S$, and sends a signal representing the absolute value $|\dot{\theta}_S|$ of the time rate of change of the steering angle to a negative input terminal of the comparator 21 as the steering speed. A reference signal representing a reference value $\dot{\theta}_R$ of the steering speed is inputted to a positive input terminal of the comparator 21. The comparator 21 sends a gain control signal $S_G$ to the variable gain amplifier 115 when the absolute value $|\dot{\theta}_S|$ of the actual steering speed is equal to or lower than the reference value $\dot{\theta}_R$.

Figure 9:
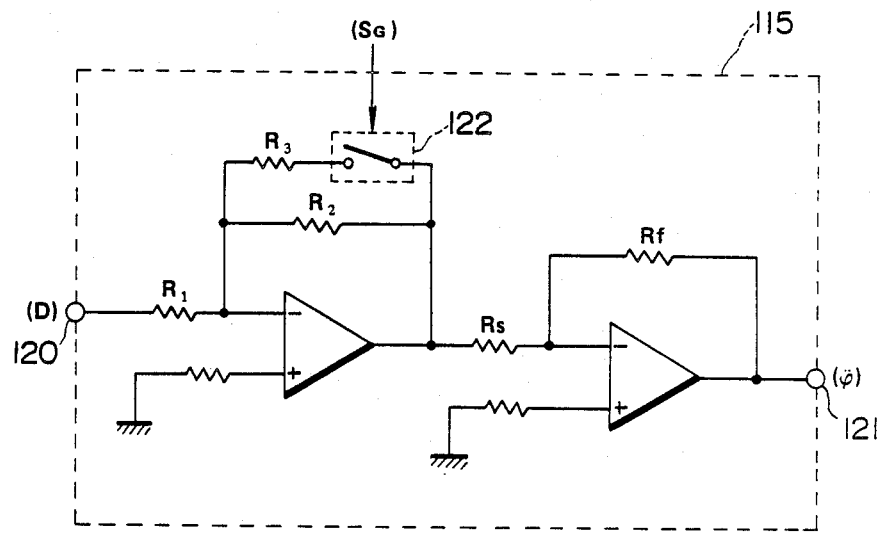
FIG. 9 is a circuit diagram of a variable gain noninverting amplifier usable in the system of FIG. 8.

FIG. 9 shows one example of the variable gain amplifier 115. In this example, a resistor R3 and an electronic switch 122 controlled by the gain control signal $S_G$ are added to the circuit of FIG. 2B. Depending on whether the electronic switch 122 is turned on or off, the amplifier 115 determines the relation between the input D and the output $\ddot{\phi}$ as expressed by the following equations, provided that the resistances of the resistors $R_s$ and $R_f$ shown in FIG. 9 are equal to each other, that is, $R_s = R_f$. When the electronic switch 122 is in the on state;

$$\ddot{\phi} = \frac{\frac{R_2 R_3}{R_2 + R_3}}{R_1} D$$

When the electronic switch 122 is in the off state;

$$\ddot{\phi} = \frac{R_2}{R_1} D$$

The system of this embodiment works as follows: The amplifiers 112–114 input the products $A_{12}\beta$, $A_{13}\delta$ and $A_{14}1/V\ \dot{\phi}$, respectively, to the adder-subtracter 303, which determines the algebraic sum (D) of these three products, expressed between parentheses in the equation (3″), and inputs the sum D to the amplifier 115. The amplifier 115 multiplies the sum D by the gain $$A_{15} = \frac{\frac{R_2 R_3}{R_2 + R_3}}{R_1}$$

when the electronic switch 122 is on, or by the gain $$A_{15} = \frac{R_2}{R_1}$$

when the switch 122 is off, and determines the yaw acceleration $\ddot{\phi}$. The thus-determined yaw acceleration is processed in the same manner as in the system of FIG. 1.

When the steering speed $|\dot{\theta}_S|$ (the output of the differentiator 20) is lower than the reference value $\dot{\theta}_R$, the electronic switch 122 is turned on, and the gain $A_{15}$ of the amplifier 115 is decreased. Consequently, the amplifier 115 oututs the yaw acceleration $\ddot{\phi}$ which corresonds to a vehicle having a large moment of inertia about the yaw axis, and accordingly, the operational unit 3 outputs the target yaw rate $\dot{\phi}$ of a small value corresponding to such a vehicle. When the steering speed $|\dot{\theta}_S|$ is higher than the reference value $\dot{\theta}_R$, the gain $A_{15}$ of the amplifier 115 is increased by the electronic switch 122, and accordingly, the amplifier 115 outputs the yaw acceleration $\ddot{\phi}$ corresponding to a vehicle having a small moment of inertia about the yaw axis. As a result, the target yaw rate $\dot{\phi}$ is increased corresponding.

When the reference setting system of the second embodiment is used for a steering control system such as the control system of FIG. 6, the control system can provide a steering control characteristic in which importance is attached to the stability of the vehicle, by decreasing the target behavior, at low steering speeds, and provide another steering control characteristic in which importance is attached to the response of the vehicle at high steering speeds, by increasing the target behavior. Therefore, the system of this embodiment can satisfy both of two conflicting requirements.

In this embodiment, the gain of the amplifier 115 is changed between two values. However, it is possible to adjust the characteristic of the operational unit 3 minutely by changing the gain of the amplifier 115 among three or more value in a stepwise manner or by varying the gain continuously as a function of the steering speed $|\dot{\theta}_s|$. Furthermore, it is possible to adjust the characteristic of the operational unit 3 by adjusting one or more other elements of the operational unit 3 in addition to the amplifier 115 or without adjusting the amplifier 115.

What is claimed is:

1. A system for determining a target value of a cornering behavior of a wheeled vehicle, comprising:
   means for sensing a steering amount,
   means for determining a steering speed which is the rate of change of the sensed steering amount with respect to time,
   means for sensing a vehicle speed,
   operational means connected with said steering amount sensing means and said vehicle speed sensing means for determining said target value expressed by equations of motion including a vehicle characterizing parameter representing the reciprocal of a vehicle yawing moment of inertia of a wheeled vehicle from the steering amount sensed by said steering amount sensing means and the vehicle speed sensed by said vehicle speed sensing means, and
   adjusting means for adjusting said parameter in accordance with said steering speed, said adjusting means lowering the value of said parameter when said steering speed is equal to or lower than a predetermined reference value and raising the value of said parameter when said steering is higher than said reference value.

2. A system according to claim 1, wherein said operational means comprises;
   first multiplying means for determining a first product of a first predetermined constant factor and a first variable,
   second multiplying means for determining a second product of a second predetermined constant factor and a second variable,
   third multiplying means for determining a third product of a third predetermined constant factor and a third variable which is the sensed steering amount,
   fourth multiplying means for determining a fourth product of a fourth predetermined constant factor and a fourth variable,
   fifth multiplying means for determining a fifth product of a fifth predetermined constant factor and a fifth variable,
   first processing means for determining a first algebraic sum of minus said first product, minus said second product, plus said third product, plus said fourth product and plus said fifth product, a first angular speed which is set equal to the integral of said first algebraic sum with respect to time, and a first angle which is set equal to the integral of said first angular speed with respect to time, said first variable being said first angular speed, said second variable being said first angle,
   sixth multiplying means for determining a sixth product of a sixth predetermined constant factor and a sixth variable,
   seventh multiplying means for determining a seventh product of a seventh predetermined constant factor and a seventh variable which is said first angle,
   eighth multiplying means for determining an eighth product of an eighth predetermined constant factor and an eighth variable,
   second processing means for determining a second algebraic sum of minus said sixth product, plus said seventh product and minus said eighth product, a first quotient obtained by dividing said second sum by the sensed vehicle speed, a second angular speed which is set equal to a difference obtained by subtracting a predetermined subtrahend from said first quotient, and a second angle which is set equal to the integral of said second angular speed with respect to time, each of said fourth and sixth variables being said second angle,
   ninth multiplying means for determining a ninth product of a ninth predetermined constant factor and a ninth variable which is said second angle,
   tenth multiplying means for determining a tenth product of a tenth predetermined constant factor and a tenth variable which is said first angle,
   eleventh multiplying means for determining an eleventh product of an eleventh predetermined constant factor and an eleventh variable, and
   third processing means for determining an angular acceleration which is set equal to the result of multiplying a third albegraic sum of minus said ninth product, plus said tenth product and minus said eleventh product by a predetermined parameter, a third angular speed which is set equal to the integral of said angular acceleration with respect to time, and a second quotient obtained by dividing said third angular speed by the sensed vehicle speed, each of said fifth, eighth and eleventh variables being said second quotient, said subtrahend being said third angular speed.

3. A system according to claim 2, wherein said cornering behavior is a yaw rate of the vehicle, and said target value is an instantaneous value of said third angular speed.

4. A system according to claim 2, wherein said cornering behavior is a lateral acceleration of the vehicle.

5. A system according to claim 2, wherein said operational means is a digital computer.

6. A system according to claim 2, wherein said first processing means comprises first integrating means for determining said first angular speed by integrating said first sum, second integrating means for determining said first angle by integrating said first angular speed, said second processing means comprises third integrating means for determining said second angle by integrating said second angular speed, said third processing means comprises fourth integrating means for determining said third angular speed by integrating said angular acceleration, and said operating means comprises resetting means for resetting said first, second, third and fourth integrating means if the sensed steering amount remains lower than a predetermined value during a predetermined time interval.

7. A system according to claim 2, wherein said operating means comprises adjusting means for determining a steering speed which is the rate of change of the sensed steering amount with respect to time, and adjusting said parameter in accordance with said steering speed.

8. A system according to claim 7, wherein said first processing means comprises first integrating means for determining said first angular speed by integrating said first sum, second integrating means for determining said first angle by integrating said first angular speed, said second processing means comprises third integrating means for determining said second angle by integrating said second angular speed, said third processing means comprises fourth integrating means for determining said third angular speed by integrating said angular acceleration, and said operating means comprises resetting means for resetting said first, second, third and fourth integrating means if the sensed steering amount remains lower than a predetermined value during a predetermined time interval.

9. A steering control system for a vehicle, comprising:
steering means comprising steerable road wheels,
a steering wheel,
a steering linkage connected between said steering means and said steering wheel for manipulating said steering means to steer the vehicle in accordance with an angular displacement of said steering wheel,
a vehicle behavior sensor for sensing an actual cornering behavior of a vehicle,
reference setting means for determining a target cornering behavior of the vehicle, said reference setting means comprising a steering amount sensor for sensing an angular displacment of said steering wheel, means for determining a steering speed which is the rate of change of the sensed steering amount with respect to time, a vehicle speed sensor, operating means connected with said steering amount sensor and said vehicle speed sensor for determining, from the sensed steering amount and sensed vehicle speed, the target behavior which satisfies predetermined equations of motion of a wheeled vehicle including a predetermined parameter representing the reciprocal of a vehicle yawing moment of inertia, and adjusting means for adjusting said parameter in accordance with steering speed said adjusting means setting said parameter equal to a low value when said steering speed is equal to or lower than a predetermined reference value and to a high value when said steering speed is higher than said predetermined reference valve,
a controller connected with said behavior sensor and said reference setting means for producing a feedback control signal in accordance with a deviation of the sensed actual behavior from the determined target behavior, and
actuating means for manipulating said steering means in accordance with feedback control signal.

10. A system for determining a target value of a cornering behavior of a wheeled vehicle comprising:
means for sensing a steering amount,
means for sensing a vehicle speed,
operational means connected with said steering amount sensing means and said vehicle speed sensing means for determining said target value expressed by equations of motion of a wheeled vehicle from the steering amount sensed by said steering amount sensing means and the vehicle speed sensed by said vehicle speed sensing means, said operation means comprising integrating means for solving said equations of motion and resetting means for resetting said integrating means if the sensed steering amount remains lower than a predetermined level during a predetermined time interval.

11. A system according to claim 10, wherein said operational means comprises:
first multiplying means for determining a first product of a first predetermined constant factor and a first variable,
second multiplying means for determining a second product of a second predetermined constant factor and a second variable,
third multiplying means for determining a third product of a third predetermined constant factor and a third variable which is the sensed steering amount,
fourth multiplying means for determining a fourth product of a fourth predetermined constant factor and a fourth variable,
fifth multiplying means for determining a fifth product of a fifth predetermined constant factor and a fifth variable,
first processing means for determining a first algebraic sum of minus said first product, minus said second product, plus said third product, plus said fourth product and plus said fifth product, a first angular speed which is set equal to the integral of said first algebraic sum with respect to time, and a first angle which is set equal to the integral of said first angular speed with respect to time, said first variable being said first angular speed said second variable being said first angle,
sixth multiplying means for determining a sixth product of a sixth predetermined constant factor and a sixth variable,
seventh multiplying means for determining a seventh product of a seventh predetermined constant factor and a seventh variable which is said first angle,
eighth multuplying means for determining an eighth product of an eighth predetermined constant factor and an eighth variable,
second processing means for determining a second algebraic sum of minus said sixth product, plus said seventh product and minus said eighth product, a first quotient obtained by dividing said second sum by the sensed vehicle speed, a second angular speed which is set equal to a difference obtained by subtracting a predetermined subtrahend from said first quotient, and a second angle which is set equal to the integral of said second angular speed with respect to time, each of said fourth and sixth variables being said second angle,
ninth multiplying means for determining a ninth product of a ninth predetermined constant factgor and a ninth variable which is said second angle,
tenth multiplying means for determining a tenth product of a tenth predetermined constant factor and a tenth variable which is said first angle,
eleventh multiplying means for determining an eleventh product of an eleventh predetermined constant factor and an eleventh variable,
third processing means for determining an angular acceleration which is set equal to the result of multiplying a third algebraic sum of minus said ninth product, plus said tenth product and minus said eleventh product by predetermined parameter, a third angular speed which is set equal to the integral of said angular acceleration with respect to time, and a second quotient obtained by dividing said third angular speed by the sensed vehicle speed, each of said fifth, eighth, and eleventh variables being said second quotient, said subtrahend being said third angular speed.

12. A system according to claim 11, wherein said cornering behavior is a yaw rate of the vehicle, and said target value of an instantaneous value of said third angular speed.

13. A system according to claim 11, wherein said cornering behavior is a lateral acceleration of the vehicle.

14. A system according to claim 11, wherein said first processing means comprises first integrating means for determining said first angular speed by integrating said first sum, second integrating means for determining said first angle by integrating said first angular speed, said second processing means comprises third integrating means for determining said second angle by integrating said second angular speed, said third processing means comprises fourth integrating means for determining said third angular speed by integrating said angular acceleration, and said operating means comprises resetting means for resetting said first, second, third, and fourth integrating means if the sensed steering amount remains lower than a predetermined value during a predetermined time interval.

15. A steering control system for a vehicle comprising:
- steering means comprising steerable road wheels,
- a steering wheel,
- a steering linkage connected between said steering means and said steering wheel for manipulating said steering means to steer the vehicle in accordance with an angular displacement of said steering wheel,
- a vehicle behavior sensor for sensing an actual cornering behavior of the vehicle,
- reference setting means for determining a target cornering behavior of the vehicle, said reference setting means comprising a steering amount sensor for sensing an angular displacement of said steering wheel, a vehicle speed sensor, operating means connected with said steering amount sensor and said vehicle speed sensor for determining, from the sensed steering amount and sense vehicle speed, the target behavior which satisfies predetermined equations of motion of a wheeled vehicle, said operating means comprising integrating means for solving said equations of motion, and resetting means for resetting said integrating means of the sensed steering amount remains lower than a predetermined level during a predetermined time interval,
- controller connected with said behavior sensor and said reference setting means for producing a feedback control signal in accordance with a deviation of the sensed actual behavior from the determined target behavior, and
- actuating means for manipulating said steering means in accordance with feedback control signal.

* * * * *